Figure 1:
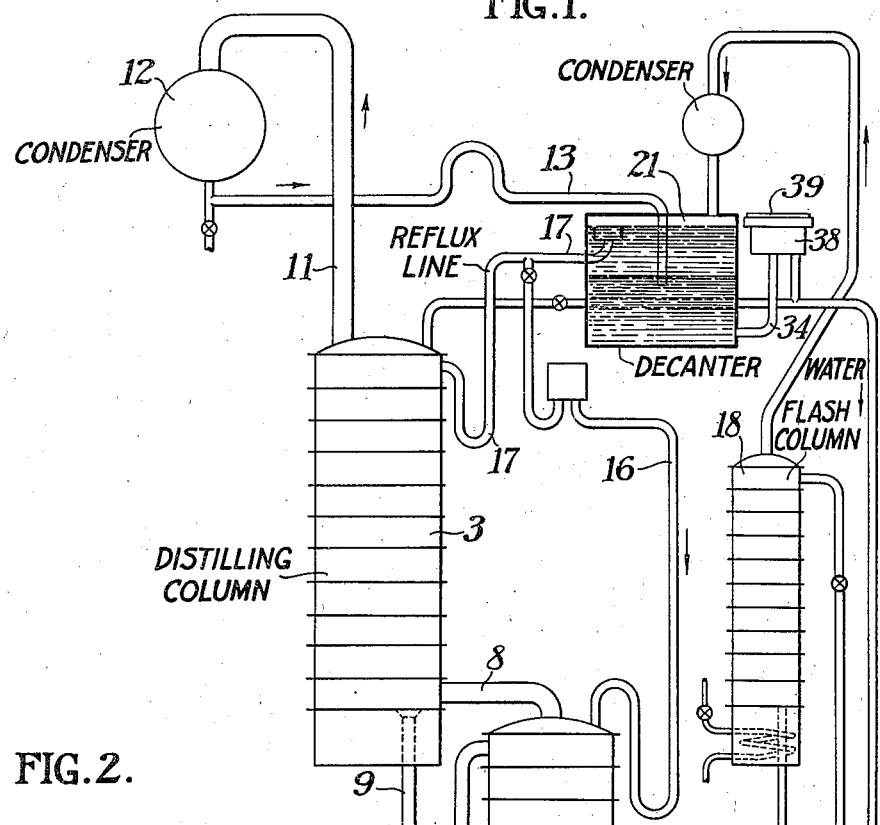

Feb. 14, 1939.  M. B. CONVISER  2,146,721
APPARATUS FOR THE AZEOTROPIC DISTILLATION OF
AQUEOUS SOLUTIONS OF ALIPATIC ACIDS
Filed Aug. 1, 1936

INVENTOR.
Maxwell B. Conviser
BY
ATTORNEYS

Patented Feb. 14, 1939

2,146,721

UNITED STATES PATENT OFFICE 2,146,721

APPARATUS FOR THE AZEOTROPIC DISTILLATION OF AQUEOUS SOLUTIONS OF ALIPHATIC ACIDS

Maxwell B. Conviser, Kingsport, Tenn., assignor, by mesne assignments, to Eastman Kodak Company, Jersey City, N. J., a corporation of New Jersey Application August 1, 1936, Serial No. 93,857

7 Claims. (Cl. 202—204)

This invention relates to improvements in apparatus for the dehydration or concentration of aqueous solutions of aliphatic acids by azeotropic distillation. More particularly, this invention concerns improvements in decanter or separator structures for distillation columns employed in continuous azeotropic distillation operations.

A number of processes for the dehydration of aqueous solutions containing aliphatic acids are shown in the allowed Gordon applications Nos. 744,250 and 26,226 now Patents 2,049,440 and 2,049,441 and Othmer Patent No. 2,028,800. In these processes as well as other processes of similar nature, water is removed from the aqueous aliphatic acid solutions as an azeotropic composition. The azeotrope is condensed and permitted to settle into layers from which the entraining agent layer may be returned to the system and the water layer discarded.

It is apparent, therefore, in such distillation operations that it is highly desirable that the separation and return steps take place in an efficient and regular manner for the best operation of the distillation process.

I have discovered an apparatus construction whereby the operation of azeotropic distillation processes is facilitated and reflux or other overflow discharge is rendered more uniform and regular.

This invention has for one object to provide apparatus for use in azeotropic distillation. Another object is to provide an apparatus construction for use in a continuous azeotropic distillation of aqueous solutions containing the lower aliphatic acids whereby overflow returns may be caused to operate regularly and uniformly. A still further object is to provide apparatus construction for use in the dehydration of aliphatic acids by azeotropic distillation with entraining agents comprised of esters and alcohols. Another object is to provide an apparatus construction for the continuous azeotropic distillation of aqueous acetic acid solutions employing ester and alcohol entrainers. Still another object is to provide an improved decanter construction for the separation of entrainer and water in processes for the azeotropic distillation of aqueous solutions containing aliphatic acids. Another object is to provide a decanter construction from which the overflow is regular and uniform. Another object is to provide a decanter construction in which the liquid level may be varied and adjusted. Other objects will appear hereinafter.

These objects are accomplished by the following invention comprising improved apparatus for the dehydration of acetic acid by azeotropic distillation. For more complete understanding of my invention, reference is made to the accompanying drawing which forms a part of the present application.

Figure 2:
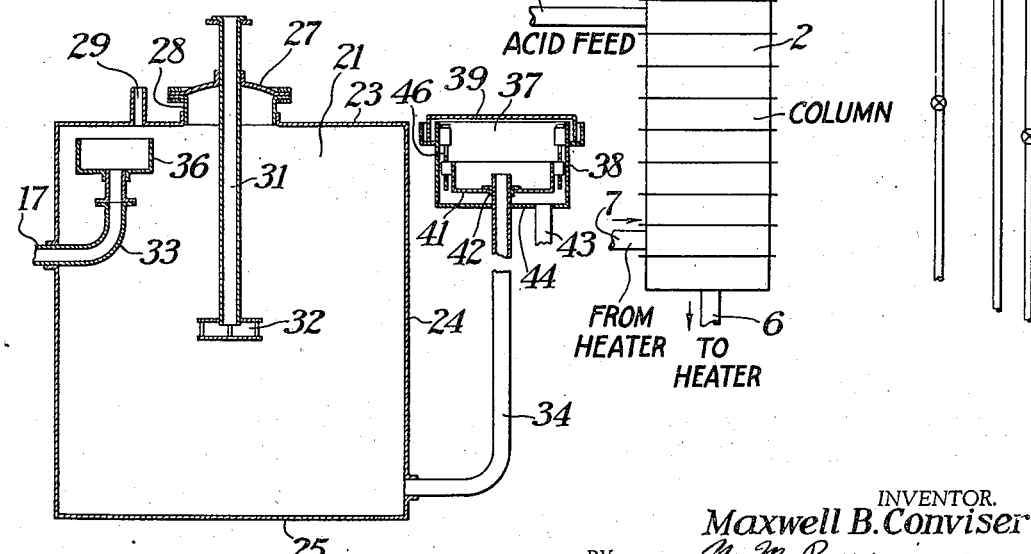

Fig. 1 is a semi-diagrammatic side-elevation view of a distillation system embodying my invention. Fig. 2 is a semi-diagrammatic side-elevation view showing in detail the construction of a decanter structure employed in my improved apparatus.

In Fig. 1, 2 represents the lower distilling column of the unit. Above is another column of similar structure designated 3. The lower column 2 is provided with feed inlet 4 and conduits 6 and 7 connected to a base heater, not shown. The lower and upper columns are connected by means of the conduits 8 and 9.

The upper column 3 is provided with a vapor outlet conduit 11 which leads through condenser 12. The condensate from 12 may be conducted through conduit 13 to the decanter or separator 21. The decanter is described hereinafter in detail under Fig. 2. A plurality of conduits 16 and 17 connect the decanter with the several columns.

My distillation system also includes a flash column 18. Inasmuch as a number of the details concerning apparatus of this type is set forth in Gordon allowed application No. 26,226 now Patent No. 2,049,441, or Othmer 2,028,800 further description appears to be unnecessary.

In Fig. 2, 21 represents a tank or container provided with a top 23, side walls 24 and a bottom 25. The decanter tank 21 may be of any shape but in general it will be cylindrical.

The top of the tank 23 is provided with a bell-shaped cover 27 which is positioned a short distance above the tank by means of the collar 28. The top of the tank may also be provided with an outlet 29 for permitting escape of gases or vapors from the decanter.

Located approximately in the center of the cap 27 and extending therethrough is a conduit 31. This conduit may be considered an extension of the conduit 13, shown in Fig. 1. The conduit may terminate in a diffuser means 32 for dispersing and distributing liquid within the decanter tank.

Since my decanter or separator serves as a settling chamber, a plurality of outlet conduits are provided for withdrawing the various components therefrom. An overflow conduit 33 is located in the upper portion of the tank for withdrawing the lighter component. Another outlet conduit 34 is connected with the lower part of the tank for withdrawing the heavier component.

I have provided that this conduit 33 will extend into the chamber defined by walls 23, 24 and 25 and may there terminate in the particular type, the basin or elliptical-shape mouth, designated 36. This form of mouth not only facilitates the flow of liquid from the tank but together with the outside overflow, shown at 37, localizes surges and otherwise improves my apparatus in continuous operation, as carried out in the azeotropic distillation of aliphatic acids.

Referring now to the outside overflow 37, this device is made up of the outer shell 38 provided with the removable top 39. Within the outer shell 38 and adjustably mounted with respect thereto is the inner pan 41. The inner pan is provided with a gasket, bushing or packed opening 42 whereby it may be raised or lowered with respect to conduit 34. The function of this adjustable arrangement is to assist in controlling the liquid levels and flow from the decanter system. Another conduit 43 is provided for withdrawing material from container 38.

While I have shown the adjustable pan 41 as slidably mounted on conduit 34 extended, it is possible that pan 41 be slidably mounted with respect to conduit 43 extended and conduit 34 terminated at the bottom 44 of the outside overflow.

Adjustability of the inside pan 41 may be obtained by means of threaded bolts 46 or by means of any other suitable element permitting the desired vertical movement.

The functioning of my apparatus is relatively clear and may be employed substantially the same as described with respect to aforementioned Gordon and Othmer patents and applications. That is, an azeotropic mixture containing entrainer and water is distilled from column 3 through conduit 11 which distillate is condensed at 12 and flows through conduit 13 to the decanter 21. By means of my new construction, the condensate is well distributed in the decanter where it readily settles into an entrainer layer and a water layer. The entrainer layer may be conducted to columns 2 or 3 or to an extractor as in the process of Gordon and Conklin 744,251. The water layer may be conducted to waste or to flash column 18 by virtue of the overflow construction of my new apparatus.

My invention possesses many advantages. For example, with my apparatus it is possible to maintain the interphase of solvent and water in the decanter at the same point at all times. This is generally quite an important feature in azeotropic distillation. Inasmuch as the depth of solvent and the depth of water which control the total amount of solvent and water in the decanter is dependent upon the relative overflow points of the solvent water, an equal rise of water over the weir of the water side will occasion a change in the position of the interphase and hence decrease the solvent in the decanter. I find that by my novel overflow construction capacity flows will not result in a displacement of solvent in the decanter and thus cause an overload of the solvent column. Since the balancing of an azeotropic column is dependent upon the total quantity of solvent in the column, then any decrease or increase of the quantity of solvent in the decanter will effect the total amount of solvent in the column and hence may have a destructing influence on the operation of the column. By my apparatus uniformity of flow is obtained. Also, the flow of solvent to the column and water to the flash column under the arrangement of my novel construction is dependent upon the rate at which distillation takes place.

While I have shown the location of the inside overflow as in the upper portion of the decanter adjacent the columns and other specific embodiments, it is apparent that my apparatus construction may be varied somewhat. For example, it is apparent that where the solvent layer is the bottom layer and the water layer is the top layer, that suitable conduit connections would be made whereby the solvent layer may be returned to the distillation column or extraction apparatus. While I have described a two-column apparatus and prefer such an arrangement, beneficial results may be obtained by employing a single column in place of columns 2 and 3 of Fig. 1 as for example, a single column as shown in Othmer 2,028,800. My new apparatus operates particularly well in processes for the azeotropic distillation of aqueous acetic acid solutions by means of butyl acetate and butyl alcohol entrainers. From the foregoing, it is apparent that various changes might be made in my novel apparatus without departing from the spirit or scope of this invention.

What I claim and desire to secure by Letters Patent of the United States is:

1. Apparatus for use in dehydrating aqueous solutions containing aliphatic acids by continuous balanced azeotropic distillation, comprising a first distillation column, a second distillation column the lower portion of which is connected to the upper portion of the first column by at least two conduits, a condenser connected with the upper portion of the second column, a decanter connected with the condenser by means of a conduit extending into the decanter, another conduit provided with a large inlet basin leading from the upper interior of the decanter to both columns, and still another conduit leading from the lower interior of said decanter to an adjustable outside overflow basin.

2. Apparatus for use in dehydrating aqueous solutions containing aliphatic acids by continuous balanced azeotropic distillation, comprising a column, means connecting the upper portion of said column through a condenser to a decanter container so as to feed into the interior of said decanter, a conduit provided with an enlarged inlet connecting the upper interior of the decanter with the upper portion of said column, and another conduit connecting the lower interior of said decanter with an adjustably mounted inner pan in an outside overflow, said outside overflow being joined to a conduit leading both to and away from the column.

3. Apparatus for use in dehydrating aqueous solutions containing aliphatic acids by continuous azeotropic distillation in a distillation system containing at least one column, comprising a decanter container having a top, bottom and side walls, an inlet conduit extending through the top and into the container a substantial distance, an overflow conduit having an enlarged mouth construction, positioned within the container and in the upper portion thereof, an overflow conduit leading from the lower portion of the container to an outside overflow basin and substantially thereinto to an inner pan positioned within the outside basin, means for adjusting the height of the inner pan to approximately the same height as the inside overflow connected therewith, and outlet means leading from the basin.

4. In apparatus for use in dehydrating aqueous solutions containing aliphatic acids by continuous azetropic distillation in a distillation system containing at least one column, a construction comprising a decanter container having a bottom and side walls, an inlet conduit terminating in diffusion means extending into the container a substantial distance, an overflow conduit having an enlarged mouth construction positioned within the container and in the upper portion thereof, an overflow conduit leading from the lower portion of the container to an outside overflow basin, and means for adjusting the effective height of the outside overflow so that it may be approximately the same as said mouth construction.

5. Apparatus for use in dehydrating aqueous solutions containing aliphatic acids by continuous azetropic distillation in a distillation system containing at least one column, comprising a decanter container adapted to hold a plurality of separable liquids therein, having a top, bottom and side walls, an inlet conduit terminating in diffusion means extending into the container so as to feed near the interphase of said liquids, an overflow conduit connected with a side wall and within the container in the upper portion thereof, an overflow conduit leading from the lower portion of a side wall to an outside overflow basin, an inner pan positioned within the outside basin, means for adjusting the height of the inner pan to approximately the same height as the overflow conduit within the container, and outlet means leading from said basin.

6. Apparatus for use in balanced azeotropic distillation in a distillation system containing at least one column, comprising a distillation column, means connecting the column through a condenser to a decanter adapted to hold a plurality of separable liquids therein, having a top, bottom and side walls, an inlet conduit extending a substantial distance into the decanter to feed in the vicinity of the interphase of said liquids, an inside overflow means positioned within the decanter in the upper portion thereof, another overflow means leading from the lower portion of the decanter to an outside overflow pan adjustably positioned at approximately the same height as said inside overflow, container means provided with an outlet, embracing said pan, and conduit means connecting the decanter with said distillation column.

7. Apparatus for use in dehydrating aqueous solutions containing aliphatic acids by continuous balanced azeotropic distillation, comprising a first distillation column, a second distillation column the lower portion of which is connected to the upper portion of the first column by at least two conduits, said columns being in juxtaposition, a condenser connected with the upper portion of the second column, a decanter connected with the condenser by means of a conduit extending thereinto, another conduit provided with a large inlet basin leading from the upper interior of the decanter, to the upper portion of the second column, and still another conduit leading from the lower interior of said decanter to an adjustable outside overflow basin provided with at least one drain conduit.

MAXWELL B. CONVISER.